United States Patent [19]

Osrow et al.

[11] 4,376,624
[45] Mar. 15, 1983

[54] EXTRUSION DIE FOR A PASTA-MAKING KITCHEN APPLIANCE

[75] Inventors: Harold Osrow, Dix Hills; Elliott Shulman, East Northport, both of N.Y.

[73] Assignee: Osrow Products Corporation, Old Bethpage, N.Y.

[21] Appl. No.: 290,576

[22] Filed: Aug. 6, 1981

[51] Int. Cl.³ .................. A21C 3/04; A21C 9/00; A21C 11/16; B29D 23/04
[52] U.S. Cl. ................................................ 425/464
[58] Field of Search ............... 425/461, 464, 467, 463, 425/468; 156/433, 500; 426/512, 516, 517, 448, 451; 99/353, 354; 72/269, 468

[56] References Cited

U.S. PATENT DOCUMENTS

| 80,890 | 8/1868 | Woliston | 425/467 |
|---|---|---|---|
| 241,068 | 5/1881 | Reeve | 425/467 |
| 320,325 | 6/1885 | Barber | 425/382 |
| 353,681 | 12/1886 | Hurlbut | 425/467 |
| 762,128 | 6/1904 | Bourquin | 425/464 |
| 1,138,101 | 5/1915 | Gammel | 425/464 |
| 1,159,489 | 11/1915 | Gammel | 425/464 |
| 1,725,959 | 8/1929 | Heath | 425/467 |
| 3,121,254 | 2/1964 | Heynen et al. | 425/DIG. 217 |
| 3,240,047 | 3/1966 | Long et al. | 72/468 |
| 3,540,080 | 11/1970 | Goossens | 425/192 S |
| 3,834,209 | 9/1974 | Robertson | 72/468 |
| 4,128,371 | 12/1978 | Kopp | 425/192 R |

FOREIGN PATENT DOCUMENTS 444585 1/1949 Italy .
451958 10/1949 Italy .

Primary Examiner—Willard E. Hoag
Attorney, Agent, or Firm—Kirschstein, Kirschstein, Ottinger & Cobrin

[57] ABSTRACT

An extrusion die for a pasta-making kitchen appliance includes a first part which has a perforated main portion and a second part which has a support portion received in a recess in the first part and having at least one projecting portion which extends into the associated aperture of the first member. Advantageously, there are as many projecting portions, all supported on the support portions, as there are apertures, and the projecting portions are received, in a one-to-one relationship, in the respective apertures. At least one fin extends radially of each of the projecting portions and contacts the surface bounding the respective aperture to support the projecting portion in such aperture. The support portion may include a plurality of discrete legs, some of which are connected with the support legs of the other pins or projecting portions, while the remaining legs engage the internal surface of a collar portion of the first member which surrounds the recess accepting the support portion. The two members can be assembled and disassembled at will to gain access to the apertures and the pins, especially for cleaning purposes. On disassembly, all pins are extracted simultaneously, and the pins are also simultaneously introduced into the respective apertures on assembly.

19 Claims, 16 Drawing Figures

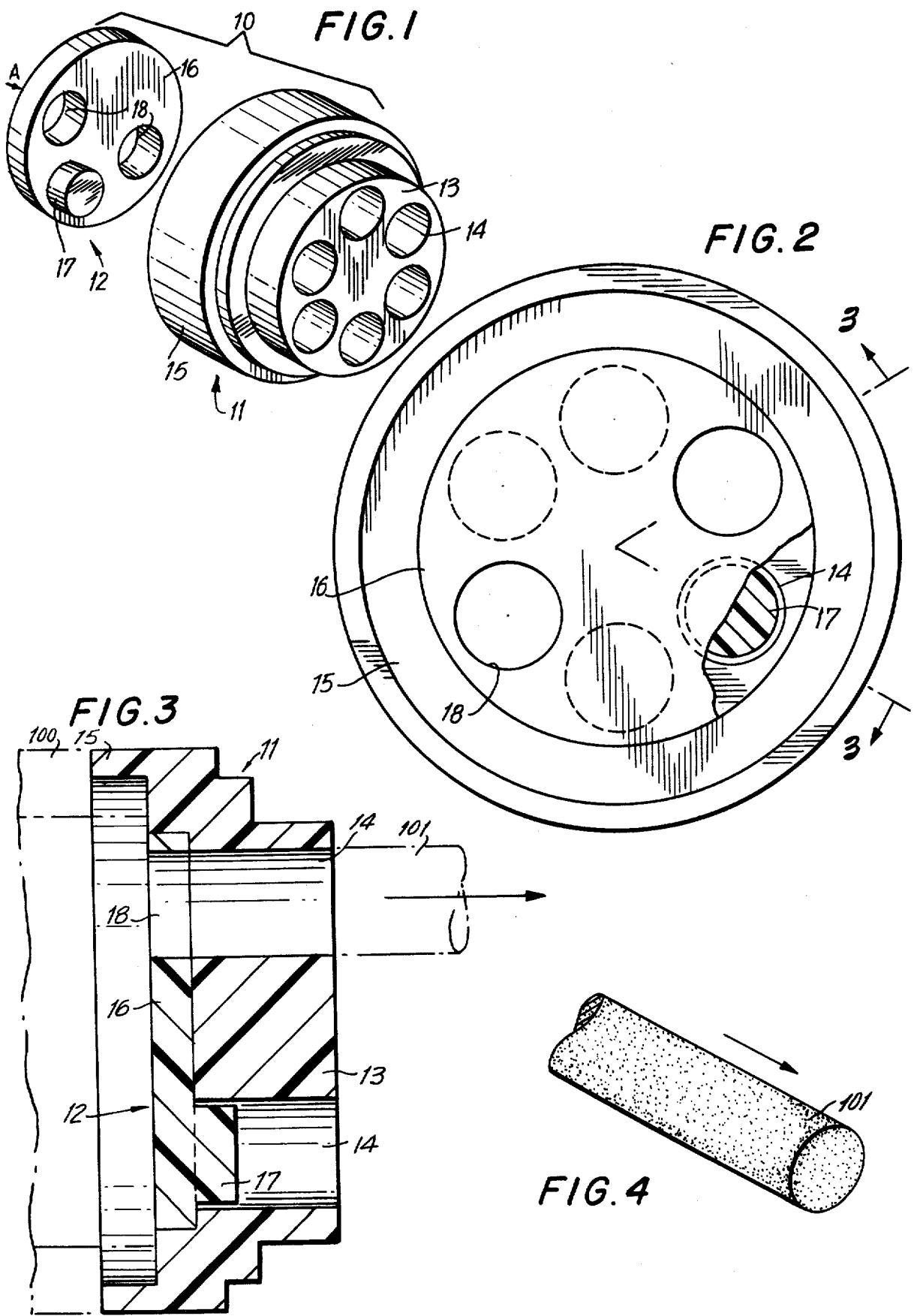

EXTRUSION DIE FOR A PASTA-MAKING KITCHEN APPLIANCE

BACKGROUND OF THE INVENTION

The present invention relates to extrusion dies in general, and more particularly to extrusion dies which are to be mounted across the path in which a farinaceous material, such as dough or pasta, is confined to travel during its expulsion in a predetermined direction from a kitchen appliance, especially from a pasta-making appliance for household use.

A kitchen appliance of the aforementioned type is disclosed, for instance, in the copending U.S. application Ser. No. 184,351 assigned to the same assignee as this application. However, this is not the only construction in which the extrusion die according to the present invention may find a useful application; thus, the exact construction of the kitchen appliance is of no consequence for the present invention.

Kitchen appliances, mainly for industrial or institutional use, have been known for many decades, as evidenced, for instance, by U.S. Pat. Nos. 762,128; 1,138,101; and 1,159,489 all of which disclose an extrusion die for producing macaroni, which includes a plate-shaped main member having a plurality of perforations, and a plurality of pin-shaped inserts individually received in the perforations and supported therein on fins integral therewith. Such constructions may be acceptable for use in an industrial environment where the machine is operated more or less continuously for at least one work shift so that it need not be cleaned after each use thereof for extruding a charge of the farinaceous material, that is, pasta or dough material. However, if it were attepted to employ this concept in smaller appliances, particularly in those to be used in households, such kitchen appliances would have only limited, if any, consumer appeal, particularly in view of the cumbersome and laborious assembling operation as well as disassembling operation which would have to be performed after each use of the kitchen appliance since otherwise the clearances between the individual pins and the surfaces bounding the perforations could not be cleaned of pasta or dough remnants so as to obtain sanitary conditions. This is one possible reason why pasta-making kitchen appliances for household use have not found widespread recognition even now when food processors of different constructions and types are in high demand.

SUMMARY OF THE INVENTION

Accordingly, it is a general object of the present invention to avoid the disadvantages of the prior art.

More particularly, it is an object of the invention to develop a pasta-making appliance which is not possessed of the disadvantages of the conventional arrangements of this type and which is suited for use in individual households.

Still another object of the invention is to provide an extrusion die for use in the kitchen appliance of the aforementioned type, which can easily be cleaned, even by washing the same in a dishwasher machine.

A concomitant object of the present invention is to so design the extrusion die of the type here under consideration as to be simple in construction, easy to assemble and use, and reliable in operation nevertheless.

Still another object of the invention is to so construct the extrusion die as to be easy to manufacture from inexpensive materials and, consequently, to have a low cost, and yet to be able to withstand without damage or rapid wear the substantial forces acting thereon during the extrusion operation.

In pursuance of these objects and others which will become apparent hereafter, one feature of the present invention resides in an extrusion die for mounting across the path in which a farinaceous material is confined to travel during its expulsion in a predetermined direction from a kitchen appliance, especially from a pasta-making appliance for household use, which extrusion die includes, briefly stated, a first member extending across the aforementioned path and including a perforated portion having an upstream and a downstream surface and a plurality of apertures extending between these surfaces substantially parallel to the aforementioned direction in the mounted position of the extrusion die; and a second member including a support portion disposed adjacent to the perforated portion at one of its upstream and downstream surfaces and at least one projecting portion extending from the support portion, in a one-to-one relationship, into one of the apertures of the perforated portion of the first member in the assembled condition of the first and second members. The bipartite construction of the extrusion die brings about the advantage that the projecting portion is removed from the associated aperture on disassembly of the first and second members and, after disassembly, not only is easily accessible for cleaning purposes, as are the now unobstructed apertures of the perforated portion, but also retains its position relative to the remainder of the second member until again assembled with the first member, which makes the introduction of the projecting portion into the respective aperture during the assembling operation a very easy task indeed.

In one advantageous construction in accordance with the present invention, the projecting portion substantially fills the cross section of the associated aperture to thereby detain the first and second members against turning relative to one another about an axis parallel to the aforementioned direction in the mounted position, and preferably even before being mounted while the two members are merely assembled with one another. In this construction, it is particularly advantageous when the support portion of the second member has at least one through passage therein which registers with another one of the apertures of the perforated portion of the first member in the mounted position. Then, it is also advantageous to provide the support portion with at least one blocking zone which is juxtaposed with at least an additional one of the apertures in such a manner as to block admission of the farinaceous material into the additional aperture in the mounted position. The latter expedient renders it possible to use one and the same first member for the production of dough or pasta products of relatively small effective cross-sectional areas, such as macaroni, where the backup pressure behind the extrusion die is sufficient for obtaining the desired consistency of the farinaceous material even when the latter is permitted to pass through all of the apertures, and for the production of dough or pasta products of relatively large solid cross-sectional areas, such as breadsticks, where such pressure would be insufficient for the aforementioned purpose if all of the apertures were unobstructed.

As mentioned above, the kitchen appliance is especially suited for the production of pasta products. The extrusion die of the present invention is designed for the production of pasta or dough products which have cylindrical outer circumferences of relatively large diameters at least during a certain stage of the formation thereof. Such products may include the aforementioned breadsticks or similar products which are solid in cross section, or macaroni and similar products which are annular in cross section, or noodles and similar products which are obtained by severing an originally tubular dough or pasta formation in its longitudinal direction at one or several locations.

For the production of the tubular formations or products, the second member of the extrusion die is provided with as many of the projecting portions as there are apertures in the perforated portion of the first member, all of the projecting portions being secured to or integral with the support portion of the second member in a distributing pattern corresponding to that of the apertures in the perforated portion of the first member, so that all of the projecting portions are simultaneously introduced into the associated apertures during the assembly, and simultaneously withdrawn from such apertures during the disassembly, of the first and second members. Consequently, the assembling and disassembling operations are very simple and easy despite the substantial number of the apertures and associated projecting portions. The projecting portions are received in the associated apertures with clearance, and the support portion has a plurality of passages therethrough for the passage of the farinaceous material through such passages and through the clearances in the mounted position.

Advantageously, the support portion includes three support legs for each of the projecting portions, these legs defining the aforementioned passages and being equiangularly spaced about the axis of the respective projecting portion. Then, it is also advantageous to provide the first member with a collar portion which is rigid with the perforated portion and has an internal surface bounding with the aforementioned one surface of the perforated portion a recess which receives the second member in the assembled condition. In this construction, it is then advantageous to let one of the support legs extend toward and engage the internal surface of the tubular collar portion to thereby center and hold the support portion of the second member in the recess of the first member. This particular manner of supporting the projecting portion is advantageous in that it assures positional stability of the projecting portion even at the high forces which act on the projecting portion and on the support portion during the extrusion, while still leaving enough room for the farinaceous material to pass between the legs in the course of the extruding operation.

However, in most instances, the above-discussed floating or cantilevered mounting of the projecting portions on the support portion of the second member would be insufficient to properly center the respective projection within the associated aperture to the degree needed to obtain products of uniform thickness. Therefore, it is proposed by the present invention to provide each of the projecting portion with at least one external fin or rib which extends axially through the clearance and engages the surface bounding the respective aperture. Hence, the fin supports the projecting portion directly in the aperture, which is in addition to the supporting action of the support portion. Of course, the presence of the fin, or of a plurality of such fins, in the aperture interferes to a certain extent with the flow of the farinaceous material through the clearance, in that such material will have to circumvent such fin or fins. This can be advantageously exploited for longitudinally severing the tubular formation which would otherwise form in the annular clearance so as to obtain one or more noodles from each clearance, depending on the number of the fins in the respective clearance. When it is desired to proceed in this manner and to obtain such noodles, the fins are so configurated as to extend all the way to the downstream surface of the perforated portion of the first member, or substantially so, so that the edge portions of the noodles are kept apart as such noodles exit from the apertures at the downstream surface. On the other hand, when it is desired to produce tubular products, such as macaroni, the fin is so configurated as to terminate a predetermined distance upstream of the downstream surface of the perforated portion, so that the farinaceous material forced through the clearance can reknit itself into the tubular formation. The reknitting is enhanced when the clearance is caused to converge in the downstream direction, at least from the downstream end of the fin a certain distance of the entire distance to the downstream surface of the perforated portion of the first member. The farinaceous material will reknit itself into the tubular formation while still confined in the clearance. Of course, under these circumstances, the support portion of the second member must be situated at the upstream surface of the perforated portion so as not to interfere with the travel of the tubular product.

The first member is preferably disk-shaped and is centered on an axis, and the apertures, preferably six of them, are equiangularly distributed at an imaginary circle centered on the axis of the disk-shaped first member.

The novel features which are considered as characteristic of the invention are set forth in particular in the appended claims. The improved extrusion die itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is an exploded perspective view of an extrusion die in accordance with the present invention;

FIG. 2 is a rear elevational view of the extrusion die taken in the direction of arrow A of FIG. 1, in its assembled condition and in a partial cross section;

FIG. 3 is a longitudinal sectional view of the extrusion die taken on line 3—3 of FIG. 2;

FIG. 4 is a perspective view of a section of a breadstick produced by using the extrusion die of FIGS. 1 to 3;

DETAILED DESCRIPTION OF THE PREFERRED EMBODIMENTS

Figure 5:
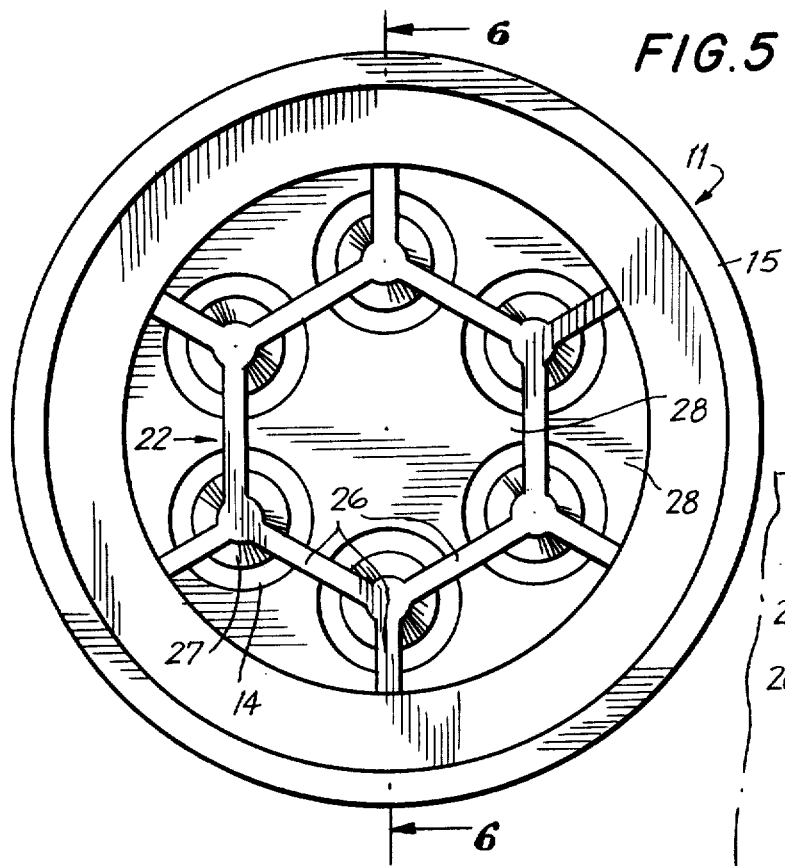
FIG. 5 is a view similar to FIG. 2 but showing a modification in the extrusion die construction.

Referring now to the drawing in detail, and first to FIG. 1 thereof, it may be seen that the reference numeral 10 has been used to identify an extrusion die according to the present invention in its entirety. The extrusion die 10 is especially suited for the production of elongated products from a farinaceous material, such as dough or pasta. When used, the extrusion die 10 will be so mounted in the expulsion passage of a kitchen appliance capable of mixing the ingredients of the farinaceous material and of kneading and expelling such material as to extend across the entire cross section of such passage. A kitchen appliance of this type, which is especially suited for household use, is disclosed, for instance, in the copending commonly owned application Ser. No. 184,351, to which reference is being had for details of construction of the kitchen appliance, and the contents of which is incorporated herein to the extent necessary for supplying background information.

The extrusion die 10 is designed for the production of elongated products which are quite large-dimensioned, such as breadsticks, strands for the production of bagels or pretzels, macaroni, or noodles. As shown particularly in FIG. 1, the extrusion die 10 consists of two parts 11 and 12, of which the first part 11 has a perforated main portion 13 provided with a plurality of apertures 14, and an annular portion 15 which axially adjoins the perforated portion 13. As best seen in FIG. 3, the first member 11 has an externally and internally stepped configuration, the external steps serving for mounting of the first member or part 11 in the exit opening of the kitchen appliance, while one of the internal steps forms a recess for at least partially receiving the second part or member 12.

The second member 12 includes a support portion 16 and a projecting portion 17 which serves as an alignment pin only in the construction depicted in FIGS. 1 to 3. As illustrated in FIG. 3, the support portion 16 is so received in the recess of the collar portion 15 of the first member 11 as to be flush with the surface which forms the next internal step, so that no dead corners are present in the path of travel of farinaceous material 100, such as dough or pasta, toward the apertures 14. It may also be seen that the projecting portion or alignment pin 17 is received in one of the apertures 14 and substantially fills the cross section thereof. Thus, the alignment pin 17 holds the second member 12 in a predetermined angular position relative to the first member 11 and prevents the second member 12 from turning about its axis with respect to the first member 11.

As shown particularly in FIGS. 1 and 2, the support portion 16 is provided with two diametrically opposite passages 18 which, in the assembled condition of the first and second members 11 and 12 as shown in FIGS. 2 and 3, register with the respective apertures 14, while the remainder of the support portion 16 is solid so that the other apertures 14 are obstructed and the admission of the farinaceous material 100 into these apertures 14 is barred. Hence, a substantial pressure can build up in the farinaceous material 100 during its expulsion from the kitchen appliance for giving the material 100 the desired consistency. Upon reaching the support portion 16, the farinaceous material 100 will enter the passages 18 in the support portion 16 and flow therethrough and subsequently through the apertures 14 aligned therewith to finally emerge at the downstream surface of the perforated portion 13 of the first member 11 in the form of a product 101 having a solid cross section and a diameter corresponding to that of the respective aperture 14. This product 101, which may best be seen in FIG. 4, may be, for instance, a breadstick. Advantageously, the first and second members 11 and 12 are made of a synthetic plastic material, so that their manufacturing cost is very low. It may be seen that, once the members 11 and 12 are disssembled, both the apertures 14 in the first member 11 and the pin 17 of the second member are easily accessible for cleaning purposes, as are the passages 18 of the second member 12.

Turning now to FIGS. 5 to 8, it may be seen that the first member 11 is identical to that discussed above. On the other hand, the other or second member is similar to the member 12 in so many respects that the corresponding parts thereof have been indicated by reference numerals greater than those assigned to the corresponding parts discussed above by ten, and the second member itself has been similarly identified by the reference numeral 22.

It may be seen in FIG. 5 that the second member 22 includes a plurality of support legs 26, always three of which are equiangularly distributed around the periphery of the respective projecting portion or pin 27. As shown, the second member 22 has six of the projecting pins 27 which are respectively received in the six apertures 14 of the first member 11, and some of the support legs 26 are interconnected to form a hexagonal frame, while the remaining legs 26 extend radially outwardly and engage the internal surface of the tubular collar portion 15 of the first member 11 to center and hold the second member 22 in the recess of the collar portion 15. The legs 26 define respective passages 28 therebetween.

Figure 6:
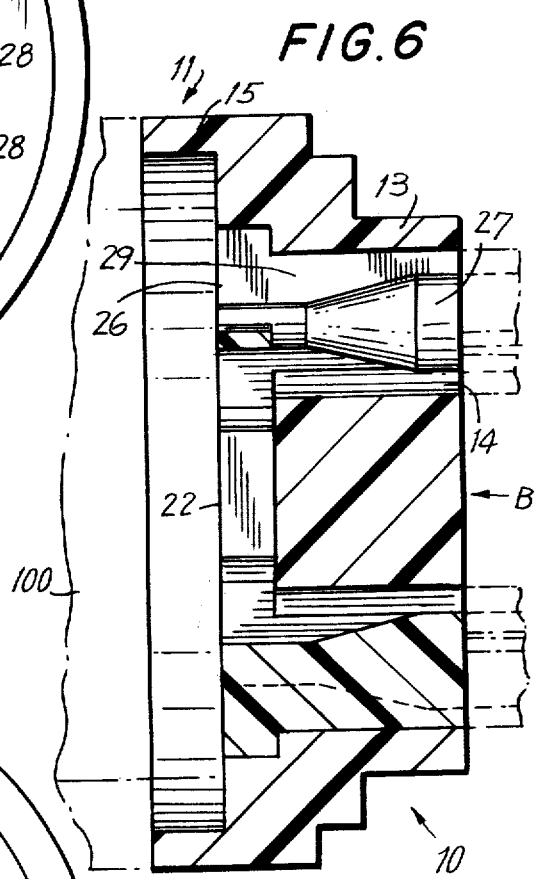
FIG. 6 is a longitudinal sectional view of the extrusion die taken on line 6—6 of FIG. 5.
Figure 7:
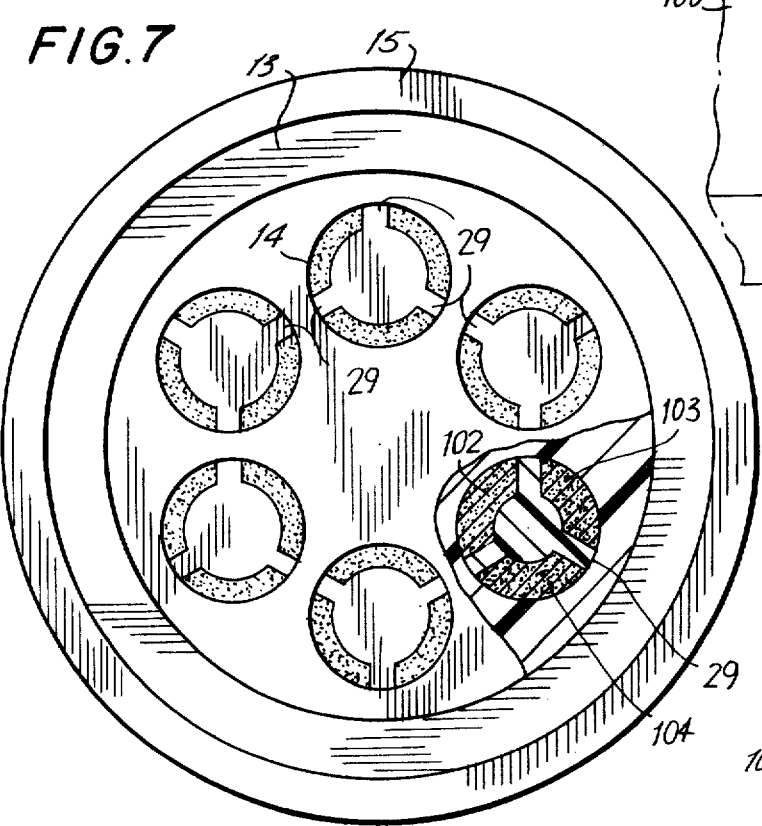
FIG. 7 is a front elevational view of the extrusion die taken in the direction of arrow B in FIG. 6.
Figure 8:
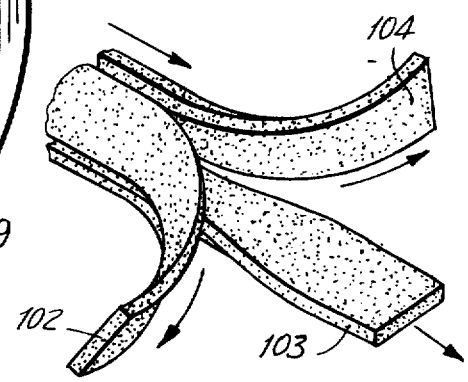
FIG. 8 is a perspective view of sections of narrow noodles produced by using the extrusion die of FIGS. 5 to 7.

FIG. 6 shows that the projecting portions or pins 27 are received in the respective apertures 14 with clearance, the width of the clearance corresponding to the desired wall thickness of noodles 102, 103 and 104 (see particularly FIG. 8) which are being produced by this extrusion die 10. Each of the pins 27 has three external fins or ribs 29 which extend radially of the respective pin 27 into contact with the surface bounding the respective aperture 14. Thus, the fins 29 support the respective pins 27 in the respective apertures 14, in addition to the supporting action provided by the legs 26. As shown, the fins are aligned with and, in fact, form continuations of the legs 26, which further facilitates the production of the second member 22, simplifies its construction, and eliminates any ridges or shoulders which could interfere with the extruding or cleaning operations. The pin 27 diverges in the downstream direction while the aperture 14 remains cylindrical, which means that the clearance converges in the same direction, whereby additional compaction of the material 100 takes place in the converging section of the clearance.

The fins 29 extend over the entire axial length of the pin, or substantially so, as a result of which the individual formations 102, 103 and 104 which are formed in the clearance between the fins 29 remain separate and are separately discharged from the passages or apertures 14 at the downstream surface of the first member 11. In this manner, there are produced relatively narrow noodles 102, 103 and 104 which have arcuate cross sections at first but eventually unfold and become flat.

Figure 9:
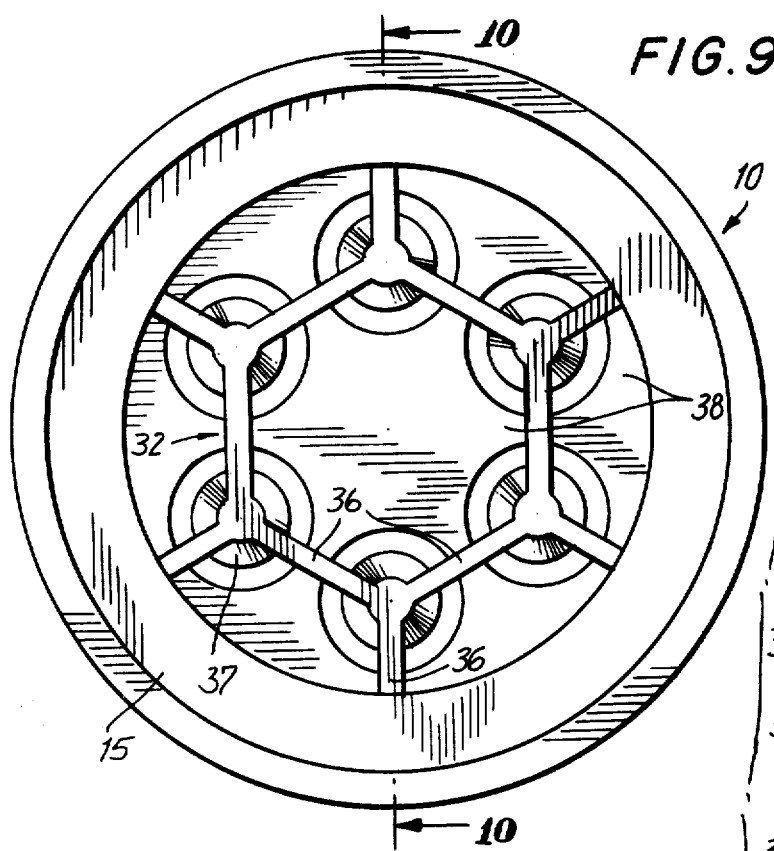
FIG. 9 is a view similar to FIG. 5 but showing a further modification of the extrusion die construction.
Figure 10:
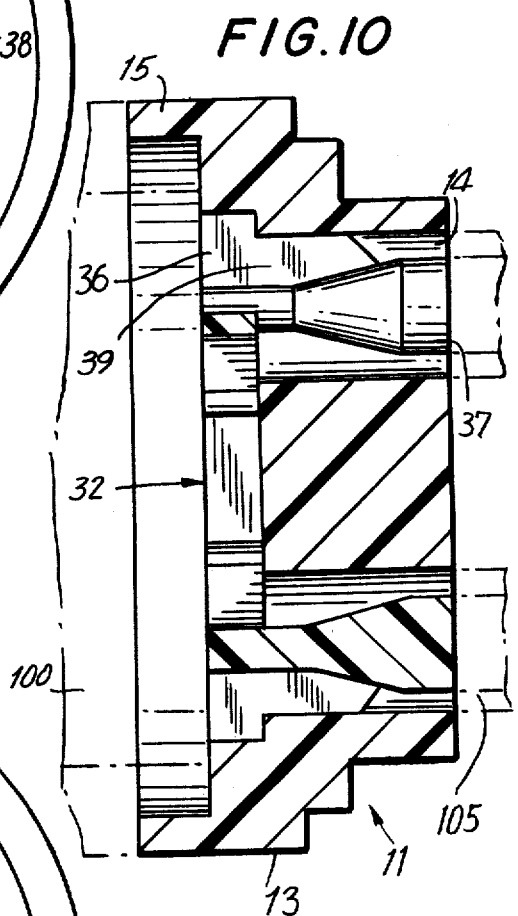
FIG. 10 is a longitudinal sectional view of the extrusion die taken on line 10—10 of FIG. 9.
Figure 11:
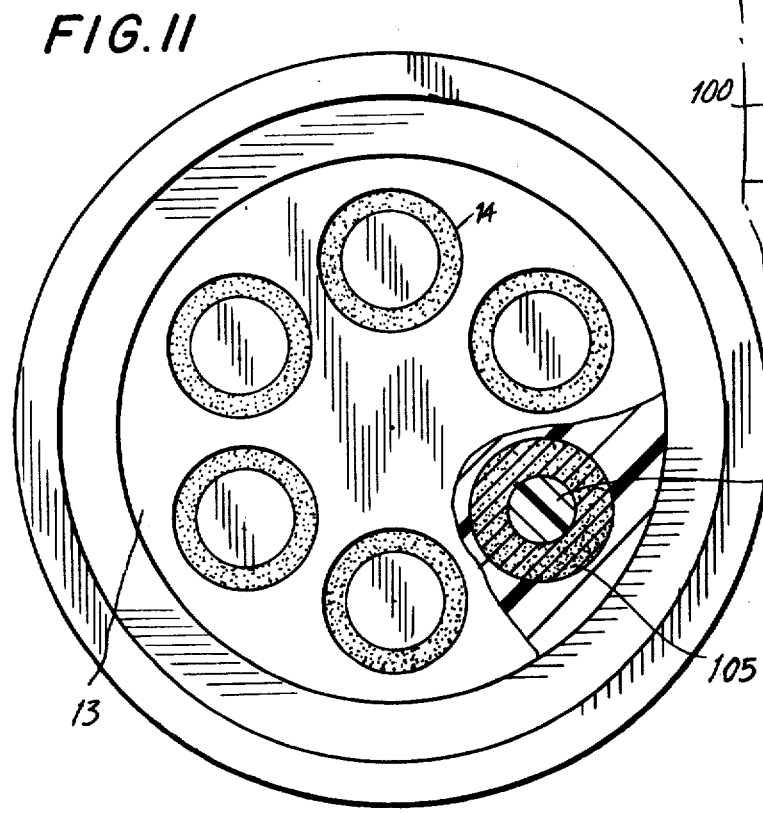
FIG. 11 is a view similar to FIG. 7 but of the extrusion die illustrated in FIGS. 9 and 10.
Figure 12:
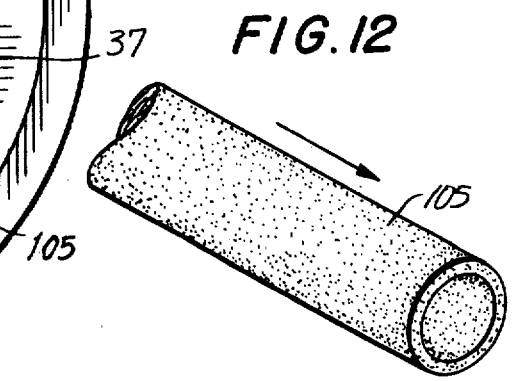
FIG. 12 is a perspective view of a tubular product produced by using the extrusion die of FIGS. 9 to 11.

Similar considerations as discussed above are applicable to the extrusion die 10 of FIGS. 9 to 12, so that again the reference numerals for the various parts of the second member (here 32) have been raised by additional ten. The extrusion die 10 of FIGS. 9 to 11 is constructed for the production of tubular products 105 (see FIG. 12). Here again, a plurality of support legs 36 constitutes the support portion of the second member 32, and a plurality of pin-shaped projecting portions 37 extends into the respective apertures 14 of the perforated main portion 13 of the first member 11, while the legs 36 are received in the above-discussed fashion in the recess of the collar portion 15 of the first member 11. Once more, the pins 37 are provided with external radial fins 39 which form continuations of the legs 36 into the apertures 14, but this time the fins 39 stop short of the downstream surface of the perforated portion 13 of the first member and of the downstream ends of the respective pins 37, so that the clearance is unobstructed downstream of the downstream edges of the fins 39 and the material 100 thus gets a chance to reknit in the clearance downstream of the fins 39, and is actually so reknitted due to the continuing convergence of the clearance. Hence, the product 105 which emerges from the clearance at the downstream end of the perforated portion of the first member 11 is tubular and circumferentially complete, as shown in FIG. 12.

Figure 13:
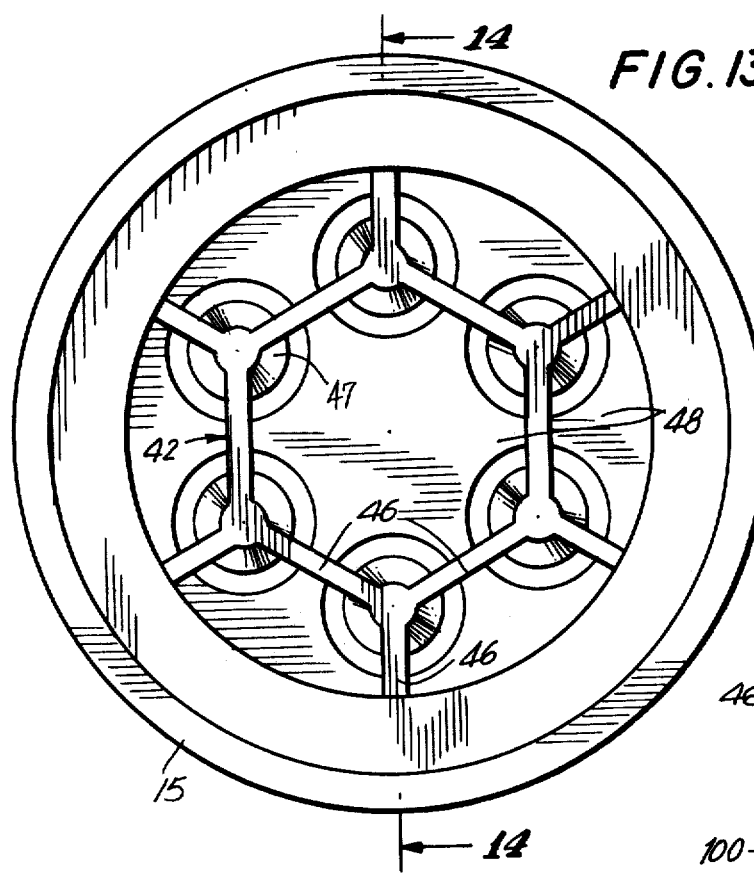
FIG. 13 is a view similar to FIG. 9 but showing yet another modification of the construction of the extrusion die.
Figure 14:
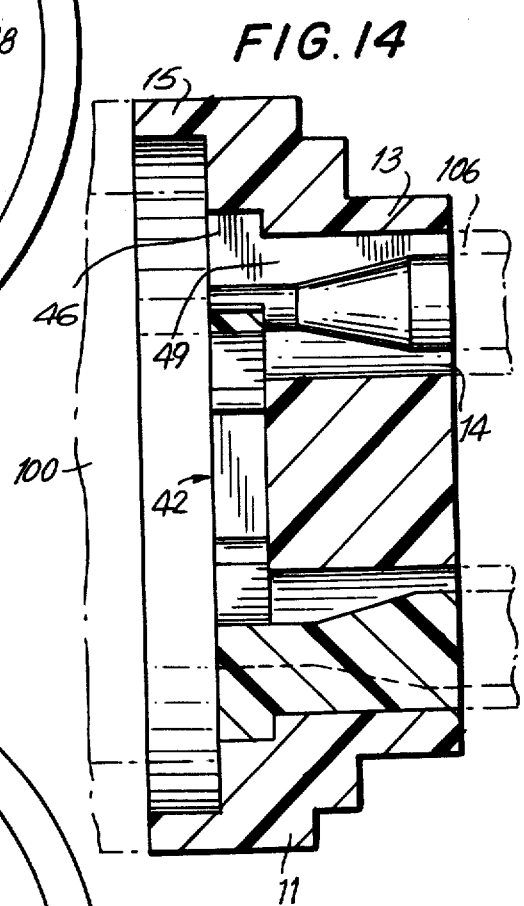
FIG. 14 is a longitudinal sectional view of the extrusion die taken on line 14—14 of FIG. 13.
Figure 15:
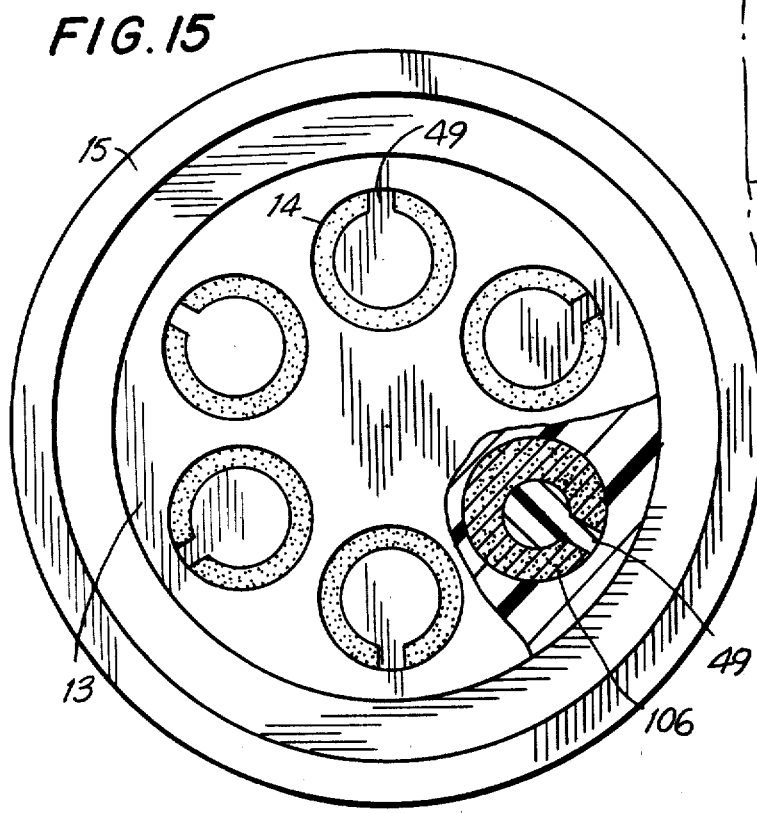
FIG. 15 is a view similar to FIG. 7 but of the extrusion die shown in FIGS. 13 and 14.
Figure 16:
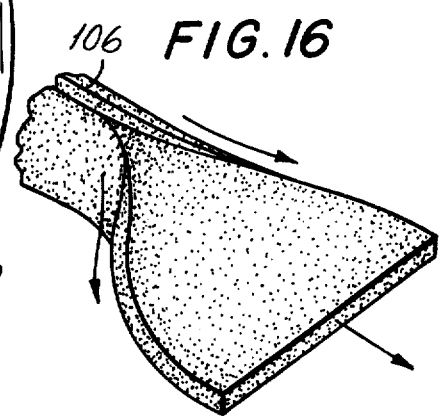
FIG. 16 is a perspective view of a section of a wide noodle produced by using the extrusion die of FIGS. 13 to 15.

Finally, in the construction of FIGS. 13 to 15, where again the reference numerals relating to the second member 42 have been increased by an additional ten, the pins 47 are supported on the support legs 46, but this time only one of the legs 46 continues into the respective aperture in the form of a single fin or rib 49 which continues through the clearance all the way to the downstream surface of the perforated portion 13 of the first member 11. The single fin 49 subdivides the material 100 only at a single longitudinal location so that a wide noodle 106 emerges from the clearance at its downstream end. However, if the support in the aperture 14 as provided by the fin 49 were insufficient, two additional fins like the fins 39 described above could be provided which would again extend only part of the way to the downstream surface so as to let the material 100 reknit while still in the clearance.

It should be evident from the above description that one feature of the present invention which is common to all the constructions discussed above is the bipartite construction of the extrusion die 10, with the apertures provided in the first member 11 and the projecting portions being united in the second member 12, 22, 32 or 42. This greatly facilitates and improves the cleaning operation, without adversely affecting the extruding operation.

It will be understood that each of the elements described above, or two or more together, may also find a useful application in other types of arrangements differing from the type described above.

While the invention has been illustrated and described as embodied in an extrusion die for a kitchen appliance for household use, it is not intended to be limited to the details shown, since various modifications and structural changes may be made without departing in any way from the spirit of the invention.

Without further analysis, the foregoing will so fully reveal the gist of the present invention that others can, by applying current knowledge, readily adapt it for various applications without omitting features that, from the standpoint of the prior art, fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. An extrusion die for mounting across the path in which a farinaceous material is confined to travel during its expulsion in a predetermined direction from a kitchen appliance, especially from a pasta-making appliance for household use,
   comprising a bipartite assembly consisting of:
   a first member extending across said path and including a perforated portion of one-piece with the first member, said perforated portion having an upstream and a downstream surface and a plurality of apertures extending between said surfaces substantially parallel to said direction in the mounted position of the extrusion die; and
   a second member including a support portion disposed adjacent to said perforated portion at one of said surfaces thereof, and at least one projecting portion extending from said support portion, in a one-to-one relationship, into one of said apertures of said perforated portion in the assembled condition of said members, said support portion and said projecting portion being of one-piece with the second member, whereby access to the apertures and at least one projection portion for cleaning purposes is obtained solely by disassembly of the two members, thereby avoiding the laborious and cumbersome disassembly of multi-part extrusion die arrangements for cleaning purposes.

2. The extrusion die as defined in claim 1, wherein said first member further includes a tubular collar portion projecting from said perforated portion around said one surface thereof and having an internal surface defining with said one surface a recess for at least partially receiving said support portion of said second member in said assembled condition.

3. The extrusion die as defined in claim 1, wherein said first member is disk-shaped and has a circular periphery centered on an axis; and wherein said apertures are equiangularly distributed along a circle also centered on said axis.

4. The extrusion die as defined in claim 1, wherein said apertures have circular cross sections, and said projecting portion is a cross-sectionally circular pin.

5. The extrusion die as defined in claim 1, wherein said projecting portion substantially fills the cross section of said one aperture to detain said members against turning relative to one another about an axis parallel to said mounted position.

6. The extrusion die as defined in claim 5, wherein said support portion has at least one through passage registering with another of said apertures in said mounted position.

7. The extrusion die as defined in claim 6, wherein said support portion includes at least one blocking zone juxtaposed with at least an additional one of said apertures to block admission of the farinaceous material into the latter in said mounted position.

8. The extrusion die as defined in claim 1, wherein said second member further includes a plurality of additional projecting portions similar to said one projecting portion, each of said projecting portions being received with clearance in one of said apertures, and said support portion having a plurality of passages for the flow of the farinaceous material therethrough and through said clearance in said mounted position.

9. The extrusion die as defined in claim 8, wherein said support portion includes a plurality of legs for each of said projecting portions, said legs defining said passages and being equiangularly spaced about the axis of the respective projecting portion.

10. The extrusion die as defined in claim 9, wherein said first member further includes a tubular collar portion projecting from said perforated portion around said one surface thereof and having an internal surface bounding with said one surface a recess for at least partially receiving said support portion of said second member; and wherein at least one of said legs of at least some of said projecting portions extends toward and engages said internal surface of said collar portion in said assembled condition.

11. The extrusion die as defined in claim 9, wherein at least some of said legs associated with different ones of said projecting portions are interconnected with one another.

12. The extrusion die as defined in claim 8, wherein said second member further includes at least one fin one each of said projecting portions extending across said clearance into contact with the surface bounding the respective aperture, for supporting the respective projecting portion in the associated aperture in the assembled condition.

13. The extrusion die as defined in claim 12, wherein said second member further includes at least one additional fin on each of said projecting portions, said additional fin being similar to said fin and equiangularly spaced therefrom about the axis of the respective projecting portion.

14. The extrusion die as defined in claim 12, wherein said fin extends substantially over the entire axial length of said clearance to longitudinally sever the generally tubular formation of the farinaceous material passing through said clearance in said mounted position.

15. The extrusion die as defined in claim 9, wherein said support portion is disposed at said upstream surface of said perforated portion of said first member; and wherein said fin extends only part of the way toward said downstream surface to permit the farinaceous material passing through said clearance in said mounted position to reknit itself downstream of said fin and while still in said clearance into a tubular formation.

16. The extrusion die as defined in claim 15, wherein said aperture converges in the downstream direction commencing at least at the downstream end of said fin.

17. An extrusion die for mounting across the path in which a farinaceous material is confined to travel during its expulsion in a predetermined direction from a kitchen appliance, especially from a pasta-making appliance for household use, comprising a bipartite assembly consisting of:
a first member extending across said path and including a main portion of one-piece with the first member, said main portion having an upstream and a downstream surface and at least one aperture extending between said surfaces substantially parallel to said direction in the mounted position of the extrusion die; and
a second member including at least one projecting portion received, in a one-to-one relationship, in said aperture to define an annular clearance therewith, and a support portion disposed adjacent to said main portion of said first member at one of said surfaces thereof, said support portion and said projecting portion being of one-piece with the second member, whereby access to the apertures and at least one projecting portion for cleaning purposes is obtained solely by disassembly of the two members, thereby avoiding the laborious and cumbersome disassembly of multi-part extrusion die arrangements for cleaning purposes, said support portion including a plurality of legs rigid with said projecting portion and extending radially thereof at equiangular distribution about the axis of the latter.

18. The extrusion die as defined in claim 17, wherein said first member further includes a collar portion rigid with said main portion and having an internal surface bounding a recess next to said one surface; and wherein at least one of said legs of said support portion of said second member abuts said internal surface of said collar portion of said first member in said assembled condition to hold said support portion in said recess.

19. The extrusion die as defined in claim 17, wherein said second member includes six projecting portions, and wherein said first member includes six apertures for receiving the six projecting portions in a one-to-one relationship; and wherein said support portion includes a hexagonally-shaped frame each two adjacent sides of which constituting two legs rigid with a respective projecting portion; and wherein said plurality of legs includes a third leg for each projecting portion, said third leg being equiangularly spaced about the axis of its projecting portion with respect to the two legs rigid therewith.

* * * * *